(12) United States Patent
Chang et al.

(10) Patent No.: US 12,478,849 B2
(45) Date of Patent: Nov. 25, 2025

(54) DEVICE AND METHOD FOR SENSING MOVEMENT OF SPHERE MOVING ON PLANE SURFACE USING CAMERA, AND DEVICE AND METHOD FOR SENSING GOLF BALL MOVING ON PUTTING MAT

(71) Applicant: GOLFZON CO., LTD., Seoul (KR)

(72) Inventors: Soo Ho Chang, Seoul (KR); Yeong Kwang Park, Seoul (KR); Jae Hong Kim, Seoul (KR); Tae Suk Ko, Seoul (KR)

(73) Assignee: GOLFZON CO., LTD., Seoul (KR)

( * ) Notice: Subject to any disclaimer, the term of this patent is extended or adjusted under 35 U.S.C. 154(b) by 334 days.

(21) Appl. No.: 18/030,765

(22) PCT Filed: Oct. 5, 2021

(86) PCT No.: PCT/KR2021/013602
§ 371 (c)(1),
(2) Date: Apr. 6, 2023

(87) PCT Pub. No.: WO2022/075691
PCT Pub. Date: Apr. 14, 2022

(65) Prior Publication Data
US 2023/0405432 A1 Dec. 21, 2023

(30) Foreign Application Priority Data
Oct. 7, 2020 (KR) .................. 10-2020-0129422

(51) Int. Cl.
*A63B 69/36* (2006.01)
*A63B 24/00* (2006.01)
(52) U.S. Cl.
CPC ...... *A63B 69/3658* (2013.01); *A63B 24/0021* (2013.01); *A63B 2024/0028* (2013.01); *A63B 2220/10* (2013.01); *A63B 2220/806* (2013.01)

(58) Field of Classification Search
CPC ............ A63B 69/3658; A63B 24/0021; A63B 2024/0028; A63B 2220/10;
(Continued)

(56) References Cited

U.S. PATENT DOCUMENTS 5,342,051 A * 8/1994 Rankin ............. A63B 24/0021
473/409
6,520,864 B1 * 2/2003 Wilk ..................... A63B 57/00
473/407
(Continued)

FOREIGN PATENT DOCUMENTS

KR       10-1048090 B1     7/2011
KR    10-2012-0010016 A    2/2012
(Continued)

OTHER PUBLICATIONS

International Search Report for PCT/KR2021/013602 mailed Jan. 10, 2022 from Korean Intellectual Property Office.

*Primary Examiner* — Nini F Legesse
(74) *Attorney, Agent, or Firm* — Revolution IP, PLLC (57) ABSTRACT

The present invention is related to a device and method for sensing motion of sphere moving on plane using single-camera, and device and method for sensing motion of golf ball moving on putting mat that a low-cost single-camera is used for sensing a sports sphere moving on a plane as a target object, and the sports sphere can be detected without a separate dedicated lighting and a space in which the sphere moves can be recognized, so it can be used regardless of location with a simple configuration, away from the limitation that the installation position of the camera must be fixed.

9 Claims, 9 Drawing Sheets

(58) Field of Classification Search
CPC ........ A63B 2220/806; A63B 2220/807; A63B 69/3676; A63B 69/3661; G06T 7/13; G06T 7/73; G06T 2207/30224; G06V 10/10
USPC ....... 473/150, 156, 199, 404, 407, 409, 152, 473/192, 446
See application file for complete search history.

(56) References Cited

U.S. PATENT DOCUMENTS

| | | | | |
|---|---|---|---|---|
| 8,444,509 | B2* | 5/2013 | Swartz | A63B 69/3623 |
| | | | | 473/91 |
| 8,872,914 | B2* | 10/2014 | Gobush | A63B 69/3658 |
| | | | | 348/135 |
| 9,171,211 | B2* | 10/2015 | Keat | G06T 3/067 |
| 2014/0004969 | A1 | 1/2014 | Jang et al. | |
| 2017/0200277 | A1* | 7/2017 | Keat | G06T 7/248 |

FOREIGN PATENT DOCUMENTS

| | | |
|---|---|---|
| KR | 10-1141048 A | 5/2012 |
| KR | 10-2012-0084481 A | 7/2012 |
| KR | 10-2017-0020982 A | 2/2017 |
| KR | 10-1723432 B1 | 4/2017 |
| KR | 10-1826837 B1 | 2/2018 |
| KR | 10-1902283 B1 | 9/2018 |
| KR | 10-2019-0014490 A | 2/2019 |
| KR | 10-2019-0048670 A | 5/2019 |

* cited by examiner

DEVICE AND METHOD FOR SENSING MOVEMENT OF SPHERE MOVING ON PLANE SURFACE USING CAMERA, AND DEVICE AND METHOD FOR SENSING GOLF BALL MOVING ON PUTTING MAT

CROSS REFERENCE TO PRIOR APPLICATIONS

This application is the 35 U.S.C. 371 national stage of international application PCT/KR2021/013602 filed on Oct. 5, 2021 which claims priority to Korean Patent Application No. 10-2020-0129422 filed on Oct. 7, 2020. The entire contents of each of the above-identified applications are hereby incorporated by reference.

TECHNICAL FIELD

The present invention is related to a sensing device and a method for calculating information on movements of a sphere such as a golf ball, a bowling ball by acquiring and analyzing images of the sphere moving on a plane.

BACKGROUND ART

In general, a stereoscopic camera device using two cameras is used as a device for acquiring coordinate information on a three-dimensional space for an object.

That is, two-dimensional coordinate information on the target object is extracted from two-dimensional images taken by one camera and two-dimensional images taken by another camera, and three-dimensional coordinate information of the target object is calculated using a predefined correlation function for each extracted two-dimensional coordinate information.

Such a stereoscopic camera device is widely used to calculate three-dimensional position information on a target object in a space, and as the most representative example, in a virtual golf simulation device such as screen golf system, the ceiling camera and the side camera are linked in a stereoscopic manner to calculate position change information on the three-dimensional space of a golf ball.

In this way, the detection and motion state of a sports sphere is usually calculated by transmitting images taken by each of the multiple cameras to a computing device to calculate position information on a three-dimensional space, and the motion state of an object is calculated based on the obtained coordinates on the actual space.

In this regard, prior art documents such as Korean Patent Registration No. 10-1902283, Korean Patent Registration No. 10-1826837, and Korean Patent Registration No. 10-1723432 disclose technologies for virtual golf simulation systems using a stereoscopic camera sensing device.

However, there is a limitation that the motion sensing method of a sports object using a stereoscopic camera sensing device as described above can only be used if it is accurately installed by a professional technician in a specific place because the position of each of the two cameras must be fixed, and in order to sense the movement of an object in a three-dimensional space, a dedicated light must be provided. Therefore, there was a problem that the stereoscopic camera device as described above could not be easily used without spatial constraints.

In addition, since multiple cameras connected in a stereoscopic manner are required, there was a problem that the processing device that processes the image data transmitted by each camera must have a fairly high specifications of processing power.

Prior Art Documents related to the present invention are as follows:
Korean Patent Registration No. 10-1902283
Korean Patent Registration No. 10-1826837
Korean Patent Registration No. 10-1723432
Korean Patent Publication No. 10-2019-0014490
Korean Patent Registration No. 10-1141048

DISCLOSURE

Technical Problem

It is an object of the present invention to provide a device and method for sensing motion of sphere moving on plane using single-camera, and device and method for sensing motion of golf ball moving on putting mat that a low-cost single-camera is used for sensing a sports sphere moving on a plane as a target object, and the sports sphere can be detected without a separate dedicated lighting and a space in which the sphere moves can be recognized, so it can be used regardless of location with a simple configuration, away from the limitation that the installation position of the camera must be fixed.

Technical Solution

In accordance with an aspect of the present invention, the above and other objects can be accomplished by the provision of a device for sensing a sphere moving on a plane, comprising: a single camera that acquires an image at an angle of view including the plane on which the sphere moves in a single view at an arbitrary position; and a sensing processor that is configured to: set a position relationship between the single camera and a reference surface that is the plane on which the sphere moves from the image acquired by the single camera, detect an object corresponding to the sphere on the acquired image, calculate a coordinate of a position on the reference surface of the sphere using information on the position relationship and the detected object, and calculate information on movement of the sphere according to changes of the coordinate of the position on the reference surface of the sphere.

In accordance with another aspect of the present invention, there is provided a sensing device for sensing a golf ball moving on a putting mat, comprising: a single camera that acquires an image at an angle of view including the putting mat on which the golf ball moves in a single view at an arbitrary position; and a sensing processor that is configured to: set a position relationship between the single camera and a reference surface that is a plane of the putting mat on which the golf ball moves from the image acquired by the single camera; detect a feature point on an outline of an object corresponding to the golf ball on the acquired image; calculate a position coordinate of a point where a center point of the golf ball is projected vertically to the reference surface using the feature point and the set position relationship as a coordinate of a position on the reference surface of the golf ball; and calculate information on movement of the golf ball according to changes of the coordinate of the position on the reference surface of the golf ball.

In accordance with another aspect of the present invention, there is provided a method for sensing a sphere moving on a plane, comprising: acquiring an image by a single camera at an angle of view including the plane on which the sphere moves in a single view at an arbitrary position; setting a position relationship between the single camera and a reference surface that is the plane on which the sphere moves from the image acquired by the single camera; detecting a feature point on an outline of an object corresponding to the sphere on the acquired image; and calculating a position coordinate of a point where a center point of the sphere is projected vertically to the reference surface using the feature point and the set position relationship as the coordinate of the position on the reference surface of the sphere.

In accordance with another aspect of the present invention, there is provided a sensing method for sensing a golf ball moving on a putting mat, comprising: acquiring an image by a single camera at an angle of view including the putting mat on which the golf ball moves in a single view at an arbitrary position; setting a position relationship between the single camera and a reference surface that is a plane of the putting mat from the image acquired by the single camera; performing ready to sense to detect an object corresponding to the golf ball on the image acquired by the single camera; detecting hitting the golf ball from the image acquired by the single camera; calculating a position coordinate of a point where a center point of the golf ball is projected vertically to the reference surface using a point on an outline of the object and the set position relationship as a coordinate of a position on the reference surface of the golf ball; and calculating information on movement of the golf ball according to changes of the coordinate of the position on the reference surface of the golf ball.

Advantageous Effects

The device and method for sensing motion of sphere moving on plane using single-camera, and device and method for sensing motion of golf ball moving on putting mat according to the present invention have an advantageous effect that a low-cost single-camera is used for sensing a sports sphere moving on a plane as a target object, and the sports sphere can be detected without a separate dedicated lighting and a space in which the sphere moves can be recognized, so it can be used regardless of location with a simple configuration, away from the limitation that the installation position of the camera must be fixed.

BEST MODE

A device and method for sensing motion of sphere moving on plane using single-camera, and device and method for sensing motion of golf ball moving on putting mat according to the present invention will be more specifically described with reference to the drawings.

The present invention can obtain an image of any sphere moving on a plane, whether it is a golf ball or a bowling ball, using a single-camera, and analyze the image to calculate information on the movement of the sphere. For example, the sensing device according to an embodiment of the present invention can calculate movement information by detecting the movement of a golf ball putted by a user on a putting mat using a camera. Wherein the camera may be implemented as a "single camera" that acquires an image at an angle of view including a plane on which the sphere moves in a single view.

In a conventional camera sensor-based screen golf system or golf practice or putting practice system, a camera that detects the movement of a golf ball must be fixed in a predetermined position, and multiple cameras must be equipped in a stereoscopic manner to sense the three-dimensional movement of the golf ball. However, the present invention has the advantage that a single single camera can sense the movement of a golf ball at any location, breaking away from the above constraints.

Figure 1:
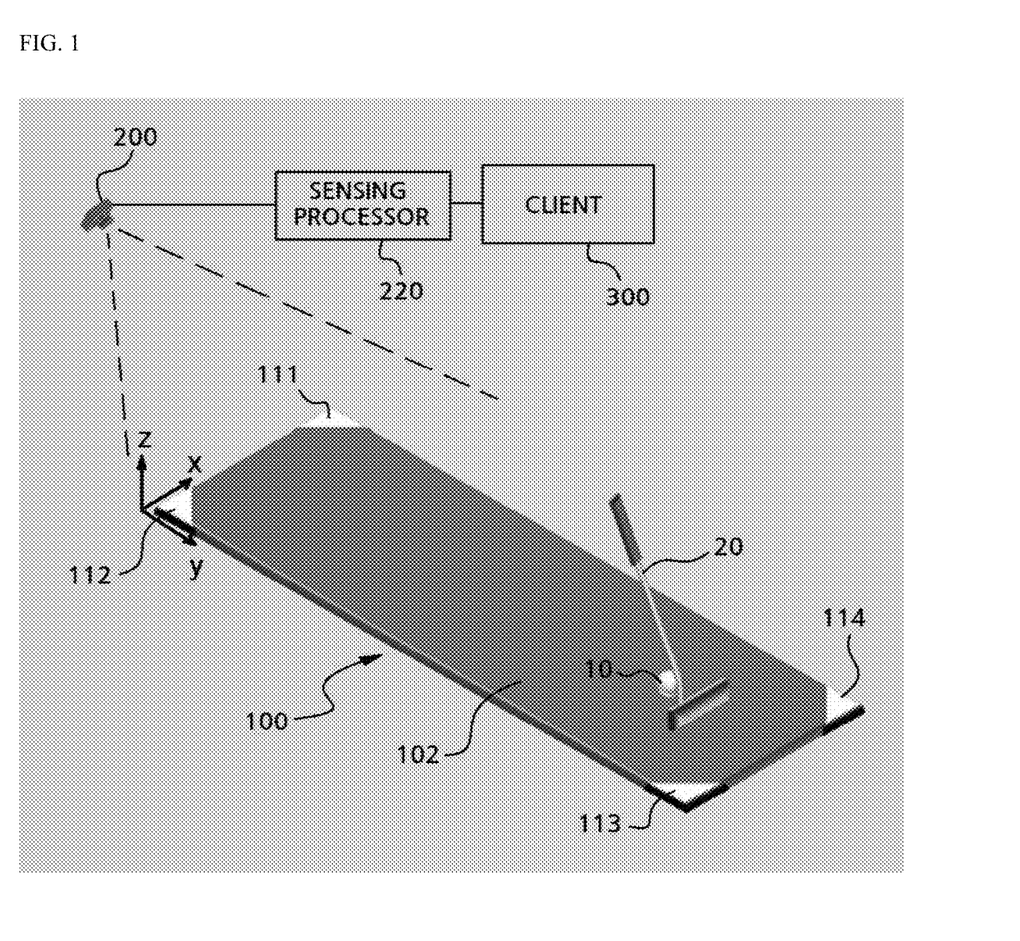
FIG. 1 shows a device for sensing a motion of a golf ball moving on a putting mat as an example of a sensing device of a moving sphere on a plane according to an embodiment of the present invention.

FIG. 1 shows a device for sensing a motion of a golf ball moving on a putting mat as an example of a sensing device of a moving sphere on a plane according to an embodiment of the present invention.

The device for sensing a sphere moving on a plane according to an embodiment of the present invention includes a single camera 200 and a sensing processor 220 as shown in FIG. 1.

The above single camera 200 acquires images with a predetermined frame per second in an angle of view including the plane on which the sphere moves, e.g., putting mat 100, in a single view at any location. For example, the above single camera acquires an image at a angle of view including a putting mat 100 on which the golf ball 10 is hit by the putter 20 and moves in a single view at a position as shown in FIG. 1.

The sensing processor may receive an image acquired by the single camera, perform image processing, and analyze the processed image to calculate information on the position on the plane of the sphere.

It is very difficult to obtain three-dimensional position information of the sphere in space due to the sense of perspective on the acquired image when an image is obtained in an angle of view at an arbitrary position rather than a preset fixed position using one camera, and even if the three-dimensional position information of the sphere is obtained, its accuracy is bound to be significantly reduced. The present invention may set a plane on which a sphere moves as a reference surface using an image acquired by a single camera and calculate a position coordinate of a point where the center point of the sphere is projected vertically on the reference surface, that is, a coordinate of a position on a plane of the sphere to calculate motion information of the sphere on the reference surface.

The sensing processor recognizes the 'reference surface' on which the sphere moves from the acquired image of the single camera, sets the positional relationship between the single camera and the reference surface, and calculates the coordinate of the position on the reference surface of the sphere from the object corresponding to the sphere on the acquired image of the single camera.

For example, as described in FIG. 1, the sensing processor 220 may recognize the preset markers 111, 112, 113, 114 on the putting mat 100 from the image acquired by the single camera 200 to set the reference surface as a plane on which the golf ball 10 moves and the position information, i.e., a three-dimensional position of the single camera with respect to the reference surface. The sensing processor may detect the object corresponding to the golf ball on the acquired image to calculate the coordinate of a point where the center point of the golf ball 10 is projected vertically to the reference surface, that is, the coordinate of the position on a plane of the golf ball.

Figure 2:
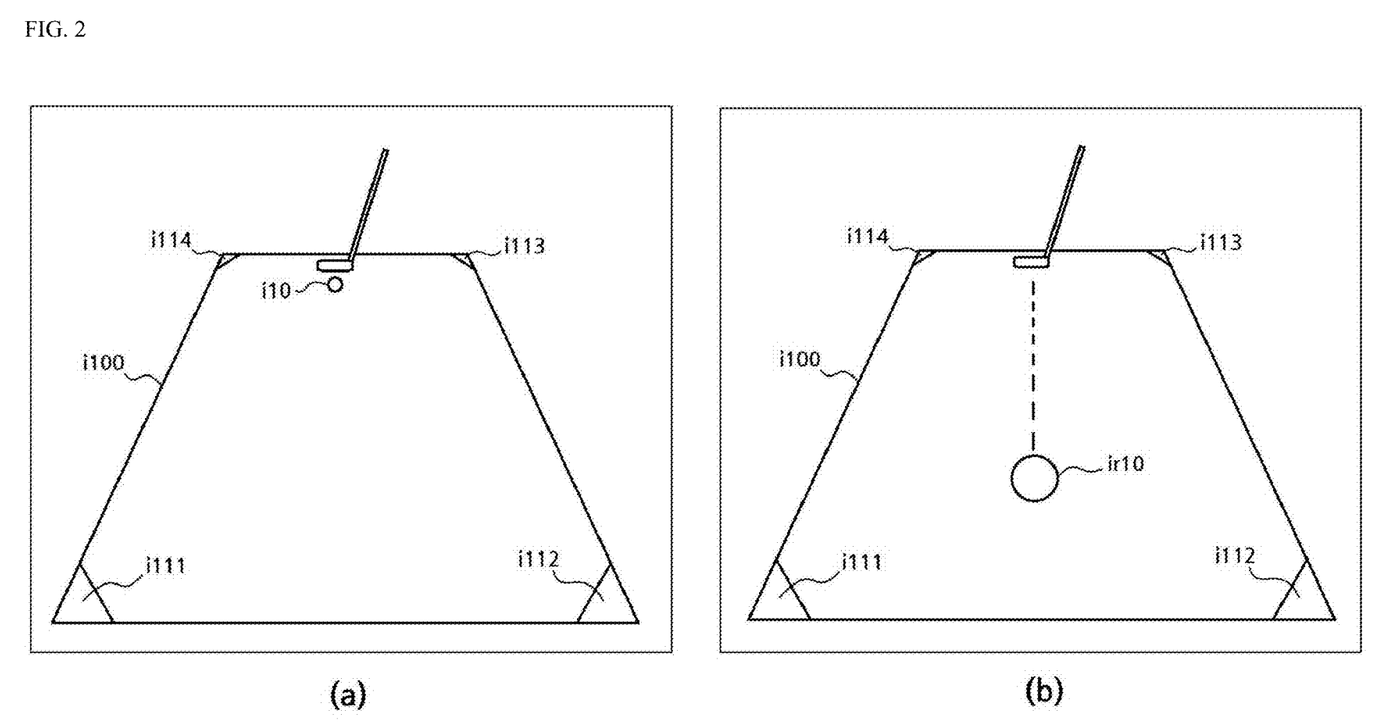
FIG. 2 shows an image acquired by a single-camera in a positional relationship between the single-camera and the putting mat as shown in FIG. 1.

As shown in FIG. 1, the positional relationship between the reference surface and the single camera can be set by recognizing and analyzing markers 111 to 114 as reference features for recognizing the reference surface from image acquired by the single camera 200 to calculate x, y, and z coordinate information of the reference surface and the single camera based on an origin of the x-y-z coordinate system FIG. 2 shows an image acquired by the single camera in the positional relationship between the single camera and the putting mat as shown in FIG. 1, and FIG. 2(a) shows the state before the golf ball is hit, and FIG. 2(b) shows the state in which the golf ball moves after being hit.

FIGS. 2(a) and (b) show the contents of the image, i100 represents the putting mat in the image, i111 to i114 represent the markers preset on the putting mat in the image, i10 represents the golf ball in a stationary state in the image, and ir10 represents the golf ball in a moving state in the image.

As shown in FIG. 1, when an image of the putting mat 100 is acquired at an angle of view that looks down obliquely from the position of the single camera 200 on the upper side, the closer to the single camera, the larger it appears in the image, and the farther away from the single camera, the smaller it appears in the image as shown in FIG. 2 (a) and (b), depending on the distance between the sphere and the single camera, the size of the sphere appears differently on the image.

As shown in FIG. 1, when an image of a spherical motion plane such as a putting mat 100 is obtained at an angle of view that looks down obliquely from the position of the single camera 200 on the upper side, the closer the putting mat's single camera is to the distance from the single camera.

Since the image acquired by the single camera is a two-dimensional image, it is very difficult to accurately determine where the sphere is on the plane due to the difference in size according to distance as described in FIG. 2(a) and FIG. 2.

However, as described above, the present invention can accurately calculate the coordinate of the position on the plane of the sphere by setting the positional relationship between the reference surface and the single camera using the 'markers' on the plane and analyzing the image using the set positional relationship.

To this end, the sensing device according to an embodiment of the present invention can recognize markers preset on the plane as shown in FIG. 1 through the image shown in FIG. 2.

Reference features for recognizing a plane on which the sphere moves may be in the form of markers 111 to 114 preset on the plane as shown in FIG. 1, or may be in the form of the plane itself (e.g., in the form of a rectangular putting mat itself as shown in FIG. 1).

The sensing device according to an embodiment of the present invention can preset information on the shape and size of the markers, and grasp information on the position of the reference plane and the single camera on the set coordinate system by analyzing how the marker part recognized through the image changed in shape and size referring to information on the preset markers.

For example, as shown in FIG. 1, when markers 111, 112, 113, 114 are prepared at the corners of the putting mat 100, and information on the shape and size of the markers 111, 112, 113, 114 is preset, and the sensing processor 220, as described in FIGS. 2(a) and (b), the sensing processor 220 can analyze changes in the shape and size of the portions i111, i112, i113, i114 corresponding to the markers by comparing them with preset information through images acquired by the single camera 200 and calculate which position coordinate the single camera is located based on the reference plane on the x-y-z coordinate system from the analysis result and store it as setting information.

In addition, the square shape of the putting mat 100 itself as shown in FIG. 1 can be preset as a reference feature for plane recognition, and the positional relationship between the reference surface and the single camera can be calculated and stored as setting information by analyzing the shape and size of the part i100 corresponding to the putting mat in the image shown in FIG. 2.

A reference feature for plane recognition may be in the form of an artificially assigned marker, or if the shape of the plane can be specified, the shape of the plane itself may be preset as a reference feature for plane recognition. In the case of artificially assigned markers, any shape marker can be used as a reference feature for plane recognition as described above if it is possible to easily analyze changes in shape and size in the image.

The sensing processor may recognize the predefined reference feature on the plane through the image of the single camera, calculate the positional relationship between the single camera and the plane, and set the reference surface as described above, and then the sensing processor can calculate where the sphere is located on the reference surface. A specific method of calculating the position of the sphere on the reference surface will be described later.

Meanwhile, the method for sensing the sphere moving on the plane according to an embodiment of the present invention will be described with reference to the flowchart of FIG. 3.

Figure 3:
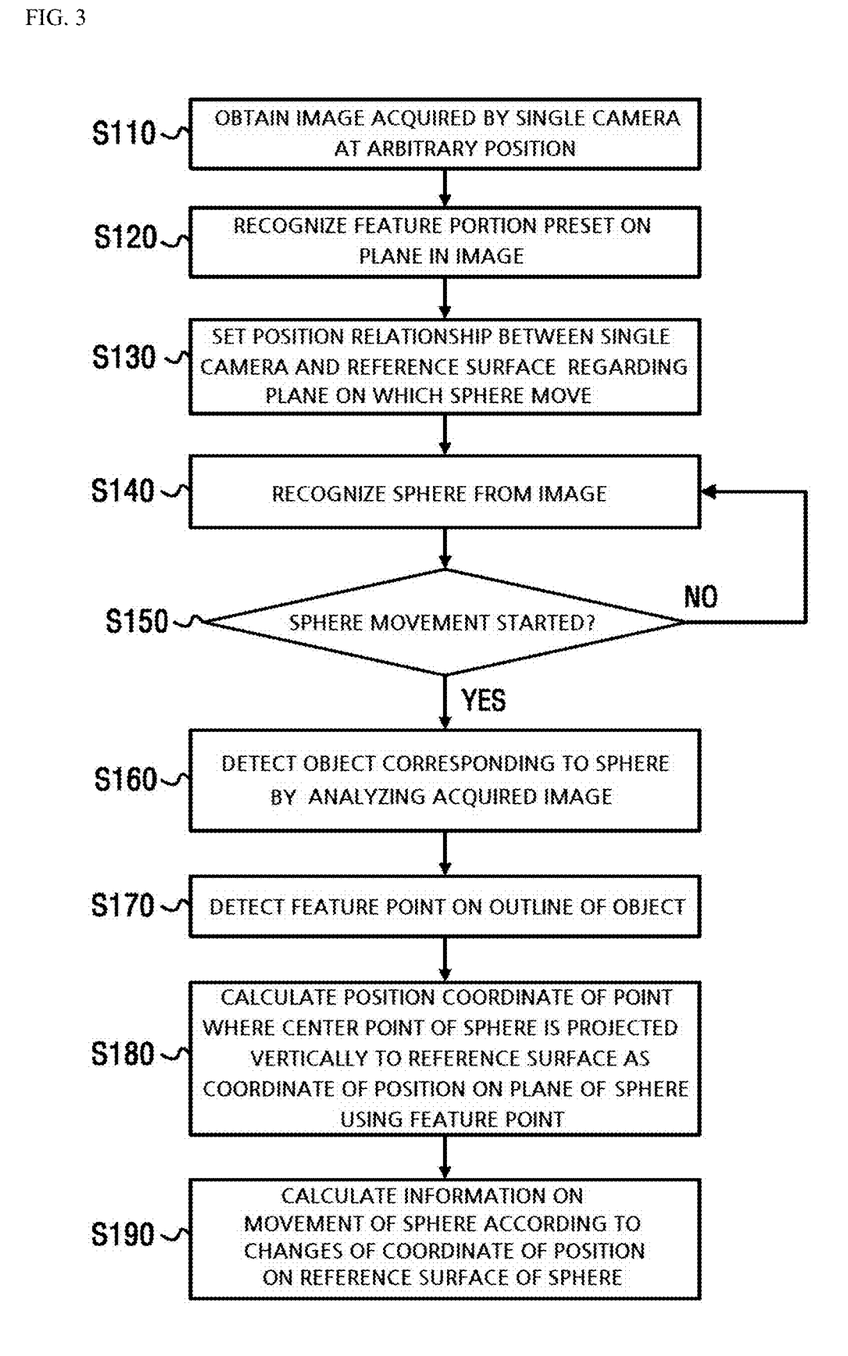
FIG. 3 is a flowchart showing a method for sensing a moving sphere on a plane using a single-camera according to an embodiment of the present invention.

The flowchart of FIG. 3 shows the method for sensing the motion of the sphere based on the configuration of the sensing device described in FIGS. 1 and 2.

First, the single camera acquires an image of the plane on which the sphere moves in the angle of view at an arbitrary position (S110).

A single camera can be configured to acquire an image by ambient lighting through adjustment of image parameters such as brightness, contrast, and gamma without dedicated lighting. The sensing processor can recognize a preset reference feature for plane recognition on the acquired image (S120), and from the recognized reference feature, can set the positional relationship between a reference surface of the plane on which the sphere moves and the single camera (S130).

The sensing processor may recognize the sphere from an image acquired by the single camera (S140), and determine whether the sphere has begun to move (S150).

If the movement of the sphere has begun, the sensing processor analyzes the image acquired by the single camera and detects the object on the image corresponding to the actual sphere (S160).

In addition, the sensing processor may detect a feature point on the outline of the detected object (S170).

The sensing processor can detect a point (feature point) on the outline of the object using from the image acquired by the single camera, and calculate the coordinate of the position of the point where the center point of the sphere is projected vertically to the reference surface as the coordinate of the position on the plane of the sphere (S180).

The movement trajectory of the sphere can be calculated by connecting the calculated coordinates of the positions on the plane of the sphere as described above for each frame of a number of frame images acquired by the single camera. In addition, the velocity of the sphere can be calculated through a change in the coordinates of the positions on the plane of the sphere based on time. In this way, movement information of the sphere including the movement trajectory and the velocity of the sphere may be calculated (S190).

Specific details on the calculation of the coordinates of the positions on the plane of the sphere using the feature points of the object on the image as described above, that is, the process from the detection of the object on the image to the calculation of coordinate information projected to the reference surface through steps S160 to S180, will be described with reference to FIGS. 4 to 6.

Figure 4:
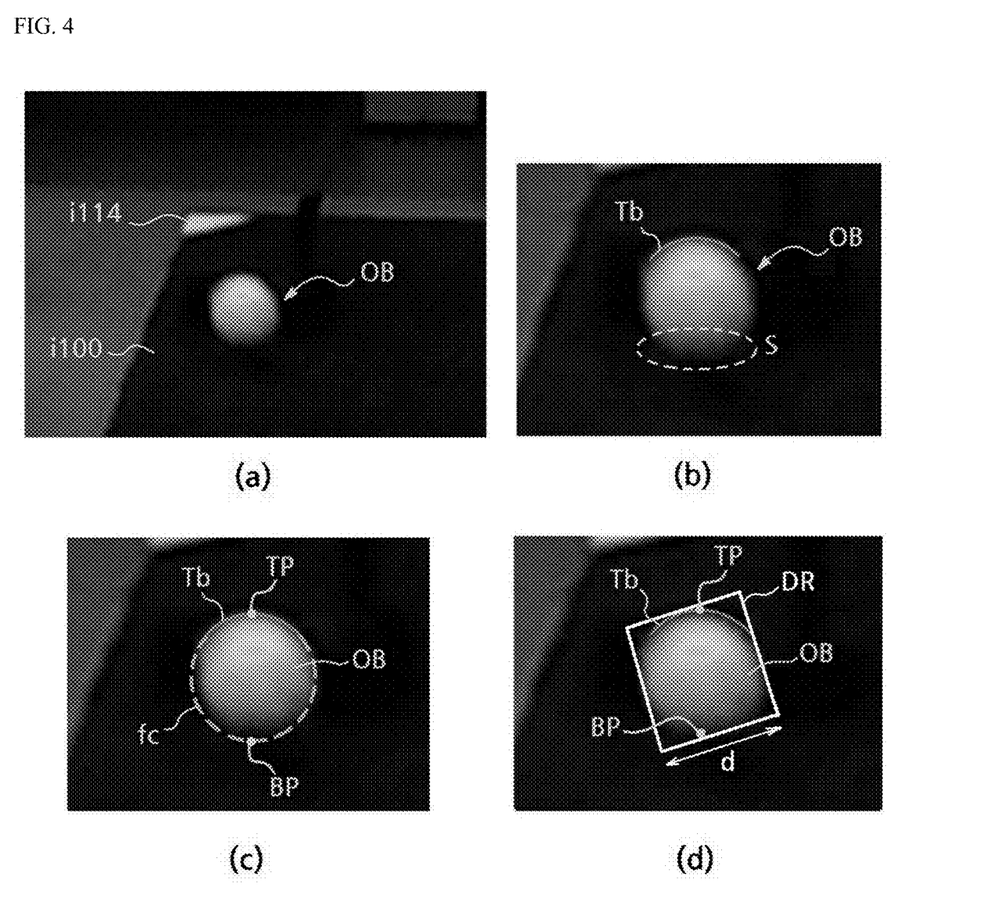
FIGS. 4 and 5 show for describing detecting an object corresponding to a sphere in an image acquired by a single-camera of a sensing device according to an embodiment of the present invention and calculating feature points for calculating a coordinate of the position on the plane of the sphere.
Figure 5:
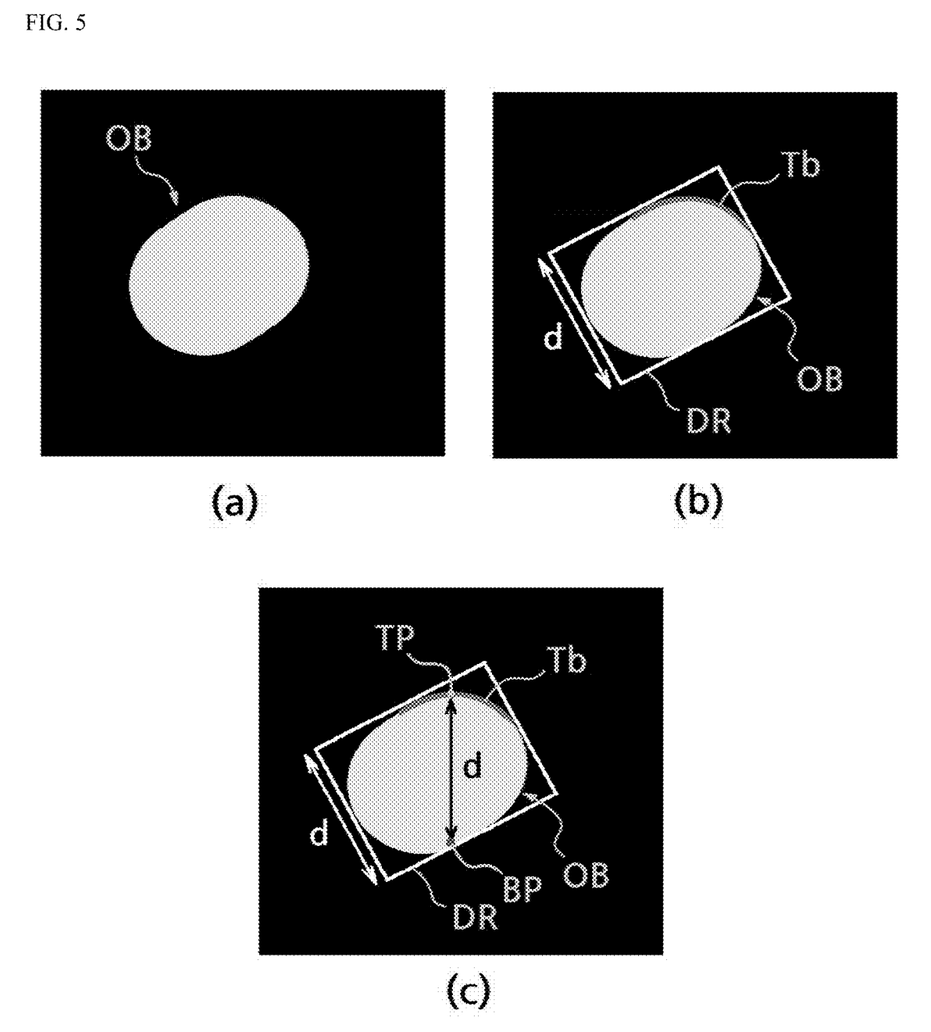

FIGS. 4 and 5 show for describing detecting an object corresponding to a sphere in an image acquired by a single-camera of a sensing device according to an embodiment of the present invention and calculating feature points for calculating a coordinate of the position on the plane of the sphere. FIGS. 6 and 7 show for describing calculating a position coordinate of a point projecting a center point of a sphere vertically to a reference surface based on a top point and a bottom point, which are feature points of the object detected by a sensing device according to an embodiment of the present invention.

First, an example of a method of detecting an object corresponding to the sphere from an acquired image of the single camera and detecting an outline thereof will be described with reference to FIG. 4.

FIG. 4(a) is an enlarged view of a part of the image acquired by the single camera in the configuration shown in FIG. 1.

The sensing processor can be set by recognizing the preset markers (i114, etc.) provided on the plane from the image shown in FIG. 4(a), calculating the positional relationship between the reference surface of the plane and the single camera using it, and storing the calculated information.

On the image acquired by the single camera, the pixels in the part corresponding to the sphere appear to have a brightness value that is quite distinct from the surrounding pixels.

However, such a group of pixels distinguished from the surroundings can appear not only as a sphere, but also as a group of pixels with brightness values that are distinct from the surroundings, for example, the part corresponding to the putter and the user's foot in the case of putting.

In this way, if a group of pixels with similar characteristics, that is, a large number of objects exist in the image, it is necessary to detect which object corresponds to a sphere.

Information such as a brightness, a roundness, and an aspect ratio for pixels on the image can be predetermined according to the characteristics of the sphere, and which object corresponds to the sphere can be detected based on the predetermined information for various objects on the image. As shown in FIG. 4, OB is indicative of the object corresponding to the sphere.

However, as shown in the image of FIG. 4 (a), since the outline of the object OB may not be clear or a complete sphere shape, it is necessary to exactly detect the outline of the object OB to calculate the coordinate of the position on the plane of the sphere.

FIG. 4(b) is an enlarged view of the object OB, and since the plane on which the sphere moves is located on the bottom surface, most of the objects on the image of the single camera taken under lighting (the same is true of natural lighting, indoor lighting, or dedicated lighting.) appear quite accurately at the upper portion of the object.

In particular, in the case of the sphere, as shown in FIG. 4 (a) and (b), since the upper portion of the object OB appears on the image quite accurately, the curved portion of the upper boundary Tb of the object can be easily specified.

However, since the plane on which the sphere moves is located on the bottom surface, a shadow is formed at the lower portion of the sphere under the light whatever it is natural or artificial. As shown in the image of FIG. 4(b), the lower portion S of the object OB partially darkens the pixel brightness of the object OB due to the influence of shadow, and the boundary of the lower portion of the object OB is quite ambiguous and the bright pixel portions shown in the image are different from the actual outline of the sphere.

The curve of the upper boundary Tb of the object OB may be used to accurately obtain the lower boundary of the object OB. FIG. 4(c) shows the result of detecting the outline of the object by obtaining a circle fc having the curvature of the curve of the upper boundary using the curve of the upper boundary Tb of the object OB.

First, as shown in FIG. 4(b), the curve of the upper boundary Tb of the object OB on the image can be obtained using the brightness value of the pixels of the object OB, for example, by predetermining the threshold of the pixel brightness value of the object and specifying the pixels corresponding to the boundary of the threshold.

After detecting the curve of the upper boundary Tb of the object as described above, the outline of the object OB may be specified by calculating a circle fc having the curvature of the curve of the upper boundary Tb as shown in FIG. 4(c).

As shown in FIG. 4(c), by detecting the outline of the object OB using the circle fc according to the curvature of the curve of the upper boundary Tb, the boundary of the lower portion of the object with an unclear boundary being lost pixels by lighting can be clearly specified.

From the outline of the object as described above, the top point TP of the object's upper boundary Tb can be obtained, and the bottom point BP of the object symmetrical to the top point TP can be detected.

As described above, the coordinate of the position on the plane of the sphere can be calculated using the feature points on the outline of the object, and the top point TP and the bottom point BP can be operated as the feature points.

As described above, after detecting the object OB corresponding to the sphere on the image, by obtaining the upper boundary Tb of the object OB and making a circle using the curvature of the curve of the obtained upper boundary, the outline of the object can be specified and the top point TP and the bottom point BP as the feature points can be detected from the outline of the object.

However, the shape of the object OB detected on the image may be in an undesirable state for specifying the outline in a circular shape. Accordingly, if the upper boundary of the object as described above does not show a desirable curve shape, the circle formed based on the curvature of the curve of the upper boundary may appear excessively large.

Therefore, the present invention can be used in parallel with a method of detecting feature points (top and bottom points) on the outline of the object by a circle fitting method that uses a circle of the curvature of the curve of the upper boundary of the object as described above and a method of detecting feature points using a detection figure DR as shown in FIG. 4(d).

As shown in FIG. 4(d), the top boundary Tb of the object OB is detected, the top point TP on the top boundary Tb is detected, and a predetermined type of figure, for example, a rectangular detection figure DR, may be generated to match the size and shape of the object OB. Using the size d of the matched detection figure DR, the bottom point BP at a position symmetrical to the top point TP and the size d can be detected.

The detection figure DR may preset the type of the figure and the shape and size of the detection figure may be generated by rotating or changing according to the object OB. For example, as shown in FIG. 4(d), it may appear as a rectangular shape in a rotated state.

Wherein, the fact that the detection figure DR matches the object OB means that the detection figure DR most suitably includes the object OB by changing or rotating the length of the side of the detection figure DR.

For example, when a detection figure (DR) is generated to include an object OB, the case where the average brightness value inside the detection figure DR is the maximum can be determined as the case where the above 'detection figure DR matches the object OB'.

The length of one side and the length of the other side may be different in the matched detection figure DR, the length of the side perpendicular to the movement direction of the sphere can be determined as the diameter d of the object, and the point at the position corresponding to the diameter d of the top point TP of the upper boundary of the object can be detected as the bottom point BP. FIG. 4(d) shows an example of detecting the top point TP and the bottom point BP, which are feature points of the object, in the above described manner.

When an object on an image acquired by a single camera is detected, the object does not appear only in a circular form, but may appear in a state where the detected object (OB) on the image is quite blurred and spread as shown in FIG. 5(a).

In this case, as shown in FIG. 5(b), when the upper boundary Tb of the object OB is detected, the curvature of the upper boundary Tb is quite large, so the exact outline of the object cannot be detected by a circle fitting method by curvature.

Therefore, in such a case, a method of detecting feature points of an object using the detection figure DR as described in FIG. 4(d) may produce a more desirable result.

As shown in FIG. 5(b), the upper boundary Tb of the object OB is detected, and the rectangular detection figure DR may be generated to match the size and shape of the object OB.

Wherein the figure type of the detection figure DR is predetermined, and its size and rotated posture may be modified according to the state of the object.

The matched detection figure DR may be a rectangular shape with a long side and a short side, and since the size of the object's smudge direction, that is, the size of the direction perpendicular to the movement direction, can be determined as the diameter of the outline of the object, the size d of the short side of the detection figure DR matched to the object OB shown in FIG. 5(b) is the diameter of the object.

Therefore, as shown in FIG. 5(c), the top point TP may be detected on the upper boundary Tb of the object, and a point of a symmetrical position by size d from the top point TP may be detected as the bottom point BP.

The circle fitting method using the curvature of the object's upper boundary shown in FIG. 4(b) and FIG. 4(c) is a method of detecting the outline of the object and obtaining the top and bottom points, which are feature points, from the outline. On the other hand, the method shown in FIG. 4 (d), FIG. 5 (b), and FIG. 5 (c) is a method of obtaining the size of the object using a detection figure and detecting the position of the top and bottom points using the size. The sensing device according to an embodiment of the present invention may accurately detect feature points of the object on the image by using the above two methods in parallel.

Using the top point TP and the bottom point BP of the detected object, a coordinate of a point where the center point of the sphere is projected vertically to the reference surface, that is, a coordinate of the position on the plane of the sphere can be obtained.

Figure 6:
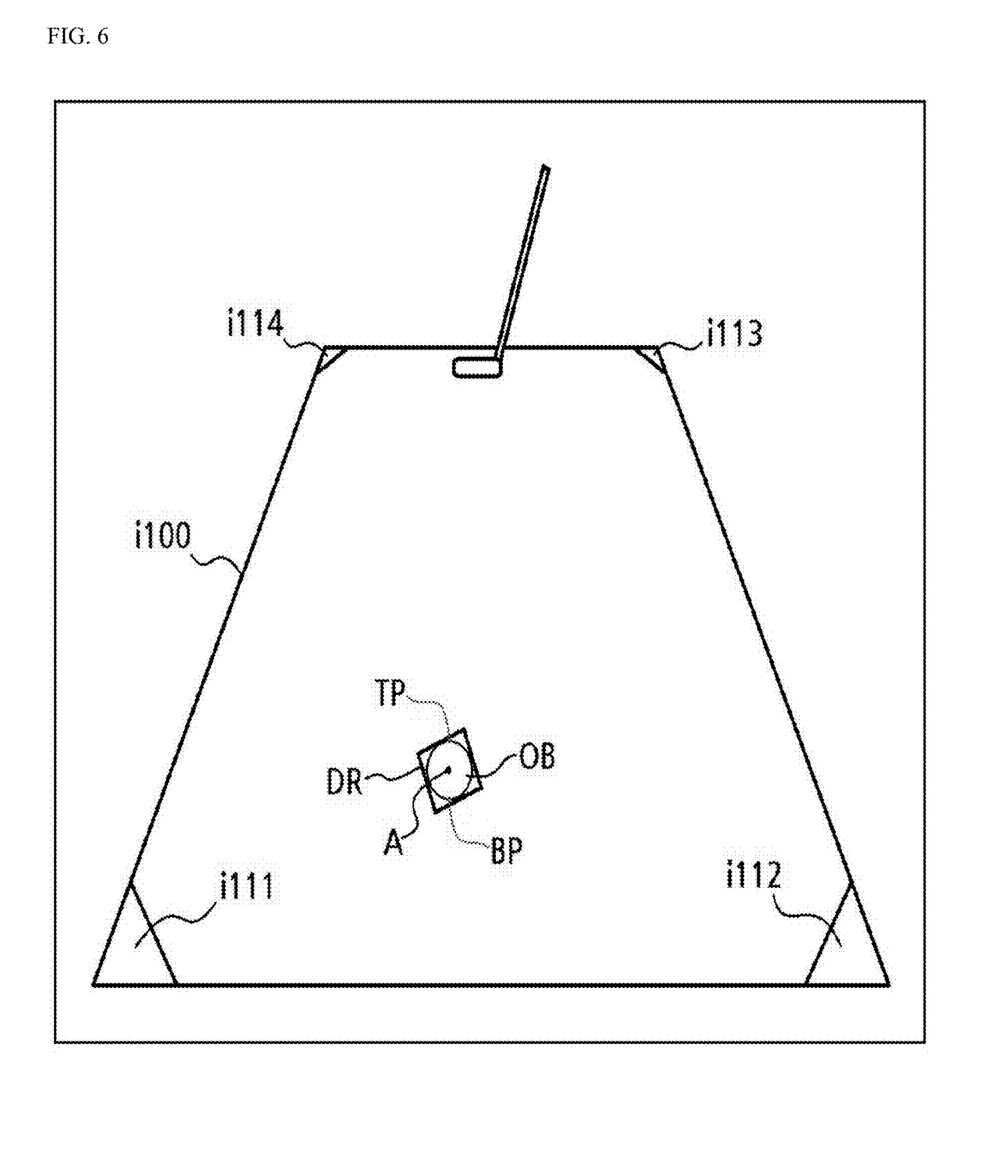
FIGS. 6 and 7 show for describing calculating a position coordinate of a point projecting a center point of a sphere vertically to a reference surface based on a top point and a bottom point, which are feature points of the object detected by a sensing device according to an embodiment of the present invention
Figure 7:
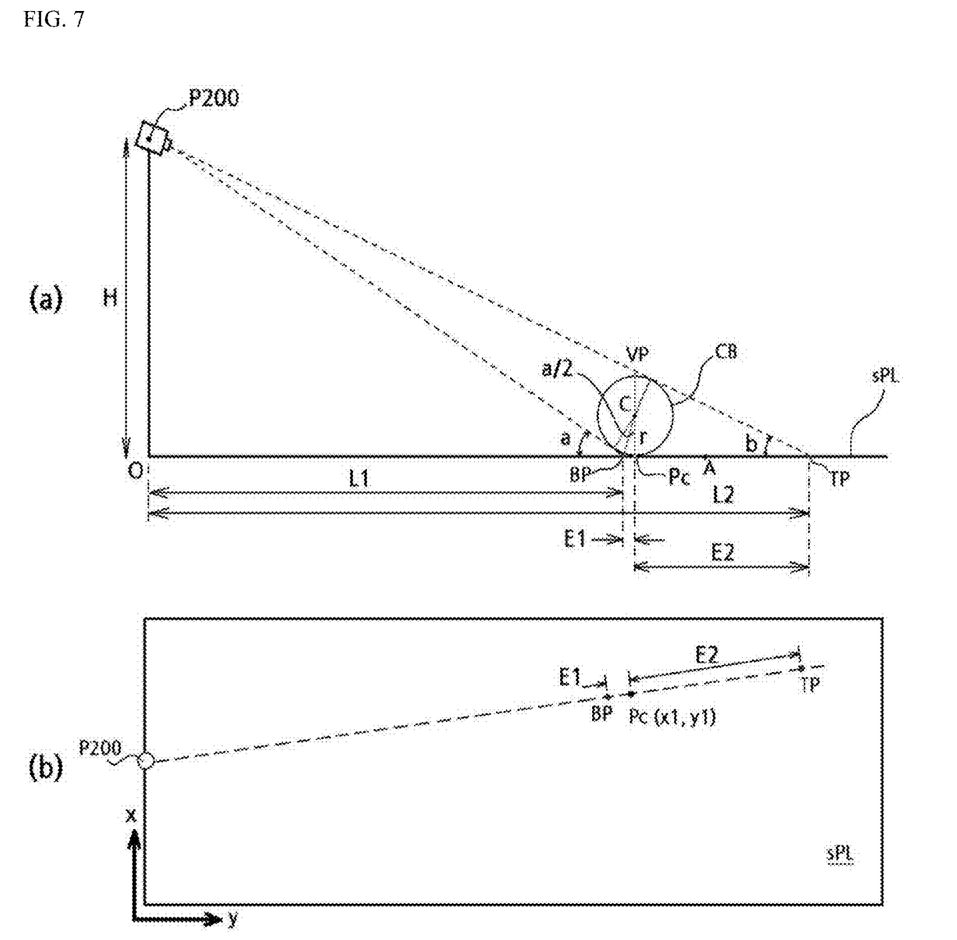

FIG. 6 shows that setting information on the position relationship between the reference surface and the single camera by recognizing the markers i111 to i114 on the image viewed by the single camera, detecting the object OB corresponding to the sphere moving on the plane, and detecting the feature points, the top point TP and the bottom point BP.

The direction of the line passing through the top point TP and the bottom point BP detected in the above method is the gaze direction of the single camera. The bottom point BP is the position of the point close to the position of the single camera on the gaze direction of the single camera, and the top point TP is the position of the point far from the position of the single camera on the gaze direction.

Using the setting information of the position relationship between the reference surface and the single camera and the position information of the top and bottom points of the object, the 'coordinate of the position on the plane of the sphere', that is, the point where the center point of the sphere is projected vertically to the reference surface can be obtained.

Wherein the above 'center point of the sphere' is completely different from the center point of the outline of the object on the image acquired by the single camera as shown in FIG. 6. It is not necessary to calculate the coordinate of the center point of the outline of the object, but even if it is calculated, the 'coordinate of the position on the plane of the sphere' cannot be accurately calculated from the center point of the outline of the object.

As shown in FIG. 6, when the center point of the outline of the object on the image acquired by the single camera is A, the A point on the image is not corresponding to the center point of the actual sphere, but a point of a position that is significantly different from the center point of the actual sphere.

Since the top point TP and the bottom point BP of the object OB shown in FIG. 6 are not corresponding to points on the actual sphere, but coordinates of the points where the gaze direction viewed from the position of the single camera meet the plane, the top point TP and the bottom point BP in FIG. 6 do not correspond to the upper point and the lower point of the sphere in the actual space.

Likewise, the center point A of the outline of the object OB shown in FIG. 6 is not corresponding to the center point of the sphere on the actual plane. Therefore, it is not possible to obtain the coordinate of the position on the plane of the sphere using the center point of the outline of the object. The coordinate of the position on the plane of the sphere can be obtained by geometric calculation using the top point TP and the bottom point BP of the object, which will be described with reference to FIG. 7.

FIG. 7 shows that calculating the position coordinate of the point projecting the center point of the sphere in the vertical direction to the reference surface based on the feature points which are the top and bottom points of the object detected as shown in FIG. 6. FIG. 7(*a*) shows a cross section cut along the gaze direction of the single camera connecting the top point TP and the bottom point BP of the object in the x-y coordinate plane of the real space, and FIG. 7(*b*) shows the x-y coordinate plane of the real space.

As described above, the sensing device according to an embodiment of the present invention can store setting information on the position relationship between the reference surface and the single camera by recognizing portions corresponding to preset markers on the image acquired by the single camera.

That is, the sensing processor of the sensing device according to an embodiment of the present invention can recognize markers from images acquired by the single camera, recognize the reference surface sPL for the plane on which the sphere moves as shown in FIG. 7(*a*), and set a geometric relationship between the reference surface sPL and the position P200 of the single camera.

According to the setting of the position relationship between the reference surface and the single camera, the height H of the single camera position P200 from the reference surface sPL can be set as shown in FIG. 7(*a*), and x, y coordinate information of the single camera position P200 can also be set as shown in FIG. 7(*b*). In addition, angle information in the gaze direction from the single camera position P200 to the reference surface sPL can be calculated using the set height and the position information of the single camera position P200, as shown in FIG. 7(*a*).

In FIG. 6, the top point TP and the bottom point BP of the object OB are the points TP and BP where the gaze direction of the single camera passing through the top and bottom of the sphere CB meet on the reference surface sPL in the actual coordinate system, as shown in FIG. 7(*a*) and FIG. 7.

The coordinate of the position on the plane of the sphere to be obtained by the sensing device of the present invention is the x, y coordinate of the point Pc where the center point C of the sphere CB is projected vertically to the reference surface sPL as shown in FIG. 7(*a*).

However, since the position of the center point C of the sphere CB is unknown, the coordinate of the Pc point can be obtained using the geometric relationship between the top point TP and the bottom point BP on the reference surface sPL as described above.

As shown in FIG. 7(*a*), the bottom point BP on the reference surface sPL is different from the point Pc where the center point C of the sphere is projected vertically to the reference surface sPL, and the difference from the point BP and the point Pc is referred to as error E1.

Likewise, as shown in FIG. 7(*a*), the top point TP on the reference surface sPL is different from the point Pc where the center point C of the sphere is projected vertically to the reference surface sPL, and the difference from the point TP and the point Pc is referred to as error E2.

In addition, as shown in FIG. 7 (*a*), the distance L1 from the origin O to the bottom point BP and the distance L2 from the origin O to the top point TP can be calculated using the position relationship information between the reference surface sPL and the position P200 of the single camera. The angle a between the reference surface sPL and the gaze direction of the single camera at the bottom point BP can be calculated from the height H of the position P200 of the single camera and the distance L1, and the angle b between the reference surface sPL and the gaze direction of the single camera at the top point TP can be also calculated from the height H of the position P200 of the single camera and the distance L2.

Since the radius r of the actual sphere is already known and preset in the sensing device, the position coordinate of the point Pc projected in the vertical direction with respect to the reference surface sPL of the center C of the sphere may be calculated by geometric calculation using the position of the bottom point BP on the reference surface sPL and the angle at the bottom point TP, and the radius of r of the actual sphere as shown in FIG. 7(*a*).

As shown in FIG. 7(*a*), error E1, which is the distance between the point Pc projected vertically from the center C of the sphere to the reference surface sPL and the bottom point BP, can be calculated, and error E2, which is the distance between the point Pc and the top point TP, can be calculated. That is, as shown in FIG. 7(*a*), the error E1 can be calculated by a trigonometric function using the angle a and the radius r of the sphere with a triangle formed by a center point C, a bottom point BP, and a point Pc. In addition, as shown in FIG. 7(*a*), the error E2 can be calculated by a trigonometric function using the angle b and the radius r of the sphere with a triangle formed by the top point TP, the point Pc and a point VP that meets the line connecting the single camera position P200 and the top point TP vertically from the center point C of the sphere.

As shown in FIG. 7(*b*), since the coordinates of the BP point and the coordinates of the TP point on the x-y coordinate plane of the reference surface sPL are already known, the x, y coordinate of the point Pc can be calculated by correcting the position of the bottom point by E1 or by correcting the position of the top point by E2.

As described above, the feature points of the object, the top point TP and the bottom point BP, can be detected and used to calculate the error E1 from the bottom point and the error E2 from the top point by geometric operation, as shown in FIG. 7(*a*). And using the above error, the coordinates of the point projected vertically from the center point of the sphere to the reference surface, that is, the coordinate of the point Pc on the x-y coordinate plane, i.e., the reference surface as the coordinate of the position on the plane of the sphere.

In this way, it is possible to calculate the plane movement information of the sphere by calculating the coordinate of the position on the plane of the sphere in the images of all frames to be analyzed among the images acquired by the single camera.

Meanwhile, the method for sensing movement of a golf ball moving on a putting mat according to an embodiment of the present invention will be described with reference to the flowchart of FIG. 8.

Figure 8:
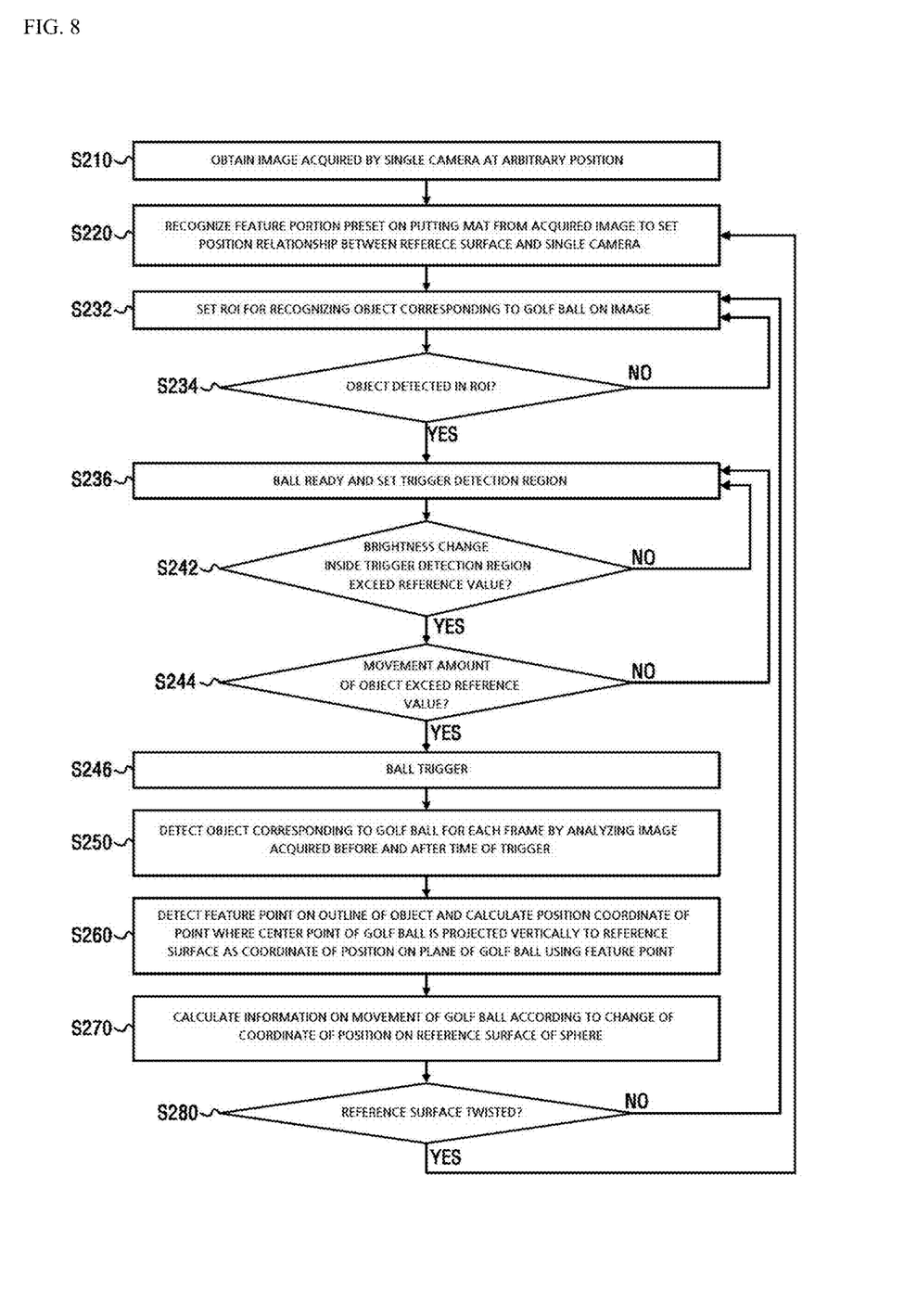
FIG. 8 is a flowchart showing a method for sensing motion of a golf ball moving on a putting mat according to an embodiment of the present invention.

If the flowchart shown in FIG. 3 shows the process of obtaining the coordinate of the position on the plane of the sphere using the image acquired by the single camera for the movement of the sphere on the plane, the flowchart shown in FIG. 8 is about the movement sensing method of the golf ball moving on the putting mat.

Therefore, the method of detecting the object on the image, detecting the outline of the object, and calculating the coordinate of the point vertically projected on the reference surface of the center point of the sphere described through FIGS. 4 to 7 can be applied the method for obtaining the coordinate of the position on the putting mat of the golf ball in the same way.

The flowchart of FIG. 8 shows a process more specifically and specialized for golf putting than the sensing method according to the flowchart of FIG. 3.

As shown in FIG. 8, first, an image is acquired by the single camera at an arbitrary position (S210), and the sensing processor recognizes markers on the putting mat from the acquired image so as to set a position relationship between the reference surface and the single camera (S220).

As shown in FIG. 9(a) showing a binary image of the image acquired by the single camera, the sensing processor can set the position of the reference surface and the position of the single camera by recognizing i111, i112, i113, and i114 corresponding to the markers of the putting mat.

As described above, in the process of setting the positions of the reference surface and the single camera, image parameters such as brightness, contrast, and gamma can be automatically adjusted so that objects can be effectively detected according to surrounding lighting.

Meanwhile, as shown in FIG. 8, the sensing processor sets the reference surface and then sets a region of interest for golf ball recognition on an image of the single camera (S232).

Figure 9:
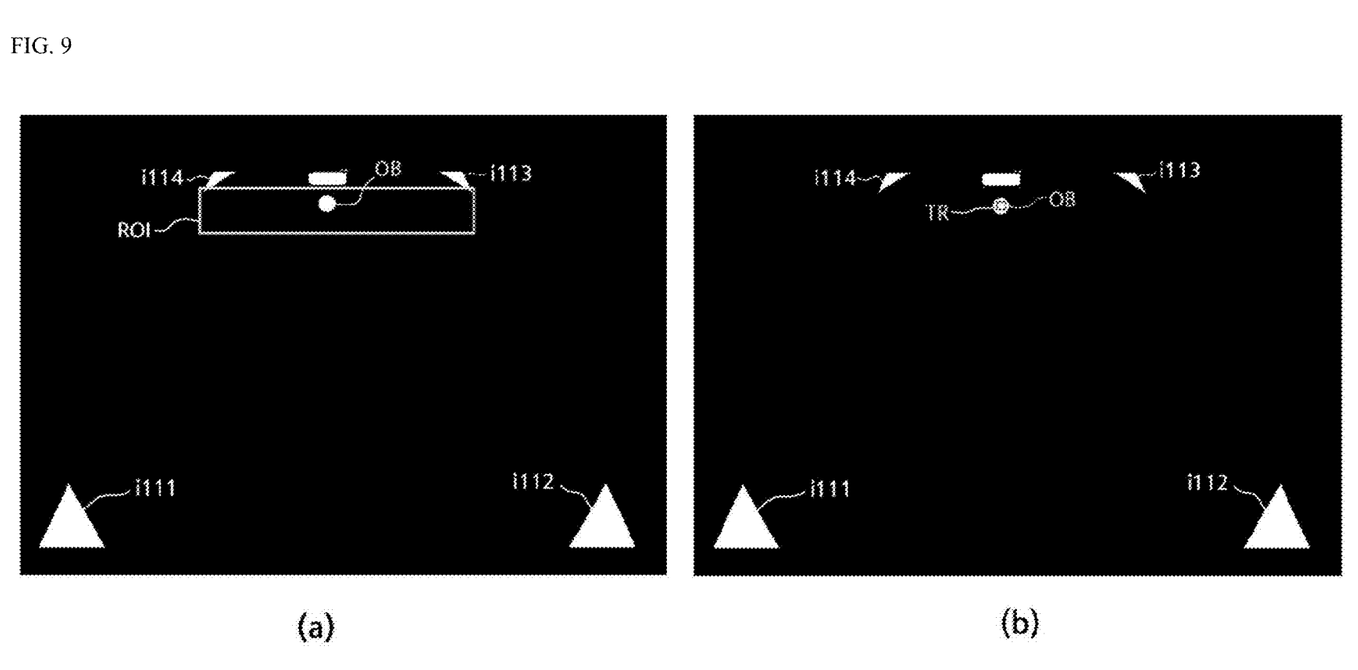
FIG. 9 shows an example of a binary image of an image acquired by a single-camera to explain a method according to the flowchart of FIG. 8.

FIG. 9 (a) shows the case where the region of interest ROI having a predetermined size and shape is set to include the object OB corresponding to the golf ball. As shown in FIG. 9(a), when it is determined that the object OB corresponding to the golf ball exists in the region of interest ROI (S234), it is determined that ready for golf shot is completed and the 'ball ready' state is made (S236).

If the region of interest ROI for the ball ready determination is set too narrow, the position where the golf ball can be placed is limited at the beginning. Accordingly, it is preferable that the region of interest ROI is set to have a large region so that the user can put and hit the golf ball in a desired position on the putting mat as shown in FIG. 9(a).

In the ball ready state, the sensing processor sets a trigger detection region TR for sensing whether the golf ball has been hit (S236). As shown in FIG. 9 (b), the trigger detection region TR may be set as an area inside the object OB.

As shown in FIG. 9(b), the sensing processor sets the trigger detection region TR in the area of the object OB and determines whether the brightness change inside the trigger detection region TR exceeds a preset reference value (S242).

In the process of detecting the brightness inside the trigger detection region TR, when the golf ball moves finely, the next step for trigger determination does not be processed because the brightness change inside the trigger detection region TR is not significant. If the golf ball is hit and the golf ball moves, the brightness inside the trigger detection region TR changes significantly.

In this way, when the brightness inside the trigger detection region TR changes significantly and exceeds a preset reference value, the sensing processor may primarily determine that the golf ball has moved and generate the first trigger signal.

For example, if the brightness value inside the generated trigger detection region TR is 100, and the reference value of the change in the brightness value for generating the first trigger signal is 30, when the object moves as described in FIG. 9(b) according to the movement of the golf ball and the brightness inside the trigger detection region TR drops from 100 to 60, a change of 40 occurred, which exceeds the reference value of 30, and thus the first trigger signal is generated.

When the first trigger signal is generated, the sensing processor detects an object from multiple frame images, calculates the movement amount of the object, and determines whether the calculated movement amount of the object exceeds a preset reference value (S244).

In fact, if the golf ball moves from an initial position on the putting mat, there may be cases when the user accidentally touches the golf ball with a putter or foot in addition to hitting the golf ball. Therefore, it is preferable to preset a reference value for the amount of movement of the golf ball and determine that the golf ball has been hit only when the golf ball moves more than the preset amount of movement.

After the first trigger signal is generated, the sensing processor consecutively detects the object from the images acquired by the single camera and calculates how much the object has moved, and when it is determined that the object has moved over the preset reference value, the sensing processor generates a ball trigger (S246).

That is, after the ball ready (S236), the sensing processor may detect whether the golf ball is hit in a dual trigger manner by detecting a change in brightness inside the trigger detection region to generate the first trigger signal, and then consecutively detecting the movement of the object to generate the ball trigger.

As described above, when the ball trigger is generated, the sensing processor retrieves and analyzes the images acquired by the single camera before and after the time of the ball trigger, and detects an object corresponding to the golf ball for each frame of the image to be analyzed (S250). This may use the same method as the method of detecting an object corresponding to the sphere described through FIG. 4.

As described above, the object is detected and the feature points on the outline of each detected object are detected. That is, as described through FIGS. 4 and 5, the outline of the object can be detected by the circle fitting method using the curvature of the upper boundary curve of the object, and the top and bottom points on the outline can be detected. Alternatively, size information of the object may be calculated using the detection figure, and the top point and the bottom point may be detected using the size information. As described above, after the feature points on the outline of the object are detected, the position coordinate of the point where the center point of the golf ball is projected vertically to the reference surface can be calculated as the coordinate of the position on the putting mat of the golf ball (S260).

The method of calculating the coordinate of the position on the putting mat of the golf ball may use the error E1 or the error E2 calculated from the top and bottom points of the object, as described above with reference to FIG. 7.

When the coordinate of the position on the putting mat of the golf ball calculated as described above is obtained for each frame of the images to be analyzed, the change in the position coordinate can be calculated, and information on the movement of the golf ball can be calculated from the change in the coordinate of the position on the putting mat of the golf ball (S270).

After calculating information on the movement of the golf ball, the sensing processor can deliver the movement information of the golf ball to a client (300, see FIG. 1), for example, a simulator of a putting simulation system or a computer of a golf information providing system, and the client can provide a user with information based on the calculated movement of the golf ball.

Meanwhile, after calculating information on the movement of the golf ball as described above, the sensing processor may examine the markers again to determine whether the reference surface is twisted in the first set state (S280). If the reference surface is twisted, return to step S220 and reset the reference surface, and if there is no change in the reference surface, the movement of the golf ball is sensed based on the previously set reference surface.

As described above, the device and method for sensing motion of sphere moving on plane using single-camera, and device and method for sensing motion of golf ball moving on putting mat according to the present invention have an advantageous effect that a low-cost single-camera is used for sensing a sports sphere moving on a plane as a target object, and the sports sphere can be detected without a separate dedicated lighting and a space in which the sphere moves can be recognized, so it can be used regardless of location with a simple configuration, away from the limitation that the installation position of the camera must be fixed.

INDUSTRIAL APPLICABILITY

A device and method for sensing motion of sphere moving on plane using single-camera, and device and method for sensing motion of golf ball moving on putting mat according to the present invention are applicable to industries related to sensing a sports sphere moving on a plane, industries related to a golf analysis based on analysis of movement of a golf ball according to a golf swing, and industries related to a virtual golf simulation system.

The invention claimed is:

1. A device for sensing a sphere moving on a plane, comprising:
    a single camera that acquires an image at an angle of view including the plane on which the sphere moves in a single view at an arbitrary position; and
    a sensing processor that is configured to:
    set a position relationship between the single camera and a reference surface that is the plane on which the sphere moves from the image acquired by the single camera,
    detect an object corresponding to the sphere on the acquired image,
    detect an upper boundary of object detected in the image,
    detect a top point on the upper boundary of the object,
    create a detection figure that matches a size and a shape of the object and detect a bottom point of the object corresponding to the top point, using a size of the detection figure,
    determine a position coordinate of a point where a center point of the sphere is projected vertically to the reference surface as a coordinate of a position of the sphere on the reference surface, using information on the set position relationship and the detected top or bottom point of the object, and
    determine information on movement of the sphere from changes of the coordinate of the position of the sphere on the reference surface.

2. The device according to claim 1, wherein the single camera is configured to acquire the image according to surrounding lighting without dedicated lighting by adjusting image parameters when setting the position relationship between the reference surface and the single camera.

3. The device according to claim 1, wherein the sensing processor is configured to recognize feature portions preset on the plane on which the sphere moves using the image and set the position relationship between the reference surface and the single camera based on information on the recognized feature portions.

4. The device according to claim 1, wherein the sensing processor is configured to:
    detect a curve of an upper boundary of the object detected in the image,
    calculate a circle having a curvature of the curve of the upper boundary and detect at least one point on the circle as a feature point, and
    calculate the position coordinate of the point where the center point of the sphere is projected vertically to the reference surface using the feature point as the coordinate of the position of the sphere on the reference surface.

5. The device according to claim 1, wherein the sensing processor is configured to
    calculate the coordinate of the position of the sphere on the reference surface by correcting an error in a point where the top point or the bottom point is projected to the reference surface along a gaze direction of the single camera using the information of the set position relationship between the reference surface and the single camera.

6. A method for sensing a sphere moving on a plane, comprising:
    acquiring an image by a single camera at an angle of view including the plane on which the sphere moves in a single view at an arbitrary position;
    setting a position relationship between the single camera and a reference surface that is the plane on which the sphere moves from the image acquired by the single camera;
    detecting an object corresponding to the sphere on the acquired image;
    detecting an upper boundary of the object detected in the image;
    detecting a top point on the upper boundary of the object;
    creating a detection figure that matches a size and a shape of the object and detecting a bottom point of the object corresponding to the top point, using a size of the detection figure;
    determining a position coordinate of a point where a center point of the sphere is projected vertically to the reference surface as a coordinate of a position of the sphere on the reference surface, using information on the set position relationship and the detected top of the bottom point of the object; and
    determining information on movement of the sphere from changes of the coordinate of the position of the sphere on the reference surface.

7. The method according to claim 6, wherein the setting the position relationship includes:
    recognizing the plane on which the sphere moves as the reference surface by recognizing feature portions preset on the plane on which the sphere moves using the image; and
    setting information on a position of the single camera based on recognizing the reference surface.

8. The method according to claim 6, wherein the determining of the coordinate of the position of the sphere on the reference surface includes:
    detecting a point where the top point or the bottom point on the outline of the object is projected on the reference surface along a gaze direction of the single camera and an angle of the gaze direction at the point; and
    calculating the coordinate of the position of the sphere on the reference surface by correcting an error in the point where the top point or the bottom point is projected to the reference surface along the gaze direction of the single camera using the information of the position relationship between the reference surface and the single camera, a size of the sphere and the detected angle.

9. A sensing method for sensing a golf ball moving on a putting mat, comprising:
    acquiring an image by a single camera at an angle of view including the putting mat on which the golf ball moves in a single view at an arbitrary position;
    setting a position relationship between the single camera and a reference surface that is a plane of the putting mat from the image acquired by the single camera;
    performing ready to sense to detect an object corresponding to the golf ball on the image acquired by the single camera;
    detecting hitting of the golf ball from the image acquired by the single camera;
    detecting a curve of an upper boundary of the object detected in the image;
    determining a circle having a curvature of the curve of the upper boundary and detecting at least one point on the circle as a feature point;
    determining a position coordinate of a point where a center point of the golf ball is projected vertically to the reference surface as a coordinate of a position of the golf ball on the reference surface, using information on the set position relationship and the detected feature point of the object; and
    determining information on movement of the golf ball from changes of the coordinate of the position of the golf ball on the reference surface.

* * * * *